(12) United States Patent
Aoyama et al.

(10) Patent No.: US 7,678,181 B2
(45) Date of Patent: Mar. 16, 2010

(54) HYDROGEN PERMEABLE MEMBRANE, FUEL CELL AND HYDROGEN EXTRACTING APPARATUS EQUIPPED WITH THE HYDROGEN PERMEABLE MEMBRANE, AND METHOD OF MANUFACTURING THE HYDROGEN PERMEABLE MEMBRANE

(75) Inventors: Satoshi Aoyama, Susono (JP); Hiromichi Sato, Atsugi (JP); Takashi Uemura, Takatsuki (JP); Osamu Mizuno, Ikeda (JP); Kentaro Yoshida, Takarazuka (JP); Tomohiko Ihara, Kawanishi (JP)

(73) Assignees: Toyota Jidosha Kabushiki Kaisha, Toyota (JP); Sumitomo Electric Industries, Ltd, Osaka (JP)

( * ) Notice: Subject to any disclaimer, the term of this patent is extended or adjusted under 35 U.S.C. 154(b) by 692 days.

(21) Appl. No.: 10/593,979

(22) PCT Filed: Jul. 21, 2005

(86) PCT No.: PCT/IB2005/002123

§ 371 (c)(1),
(2), (4) Date: Sep. 22, 2006

(87) PCT Pub. No.: WO2006/013423

PCT Pub. Date: Feb. 9, 2006

(65) Prior Publication Data

US 2007/0194452 A1    Aug. 23, 2007

(30) Foreign Application Priority Data

Jul. 26, 2004    (JP)    ............................. 2004-216953

(51) Int. Cl.
    *B01D 53/22*    (2006.01)

(52) U.S. Cl. .................. 96/11; 96/4; 95/56; 55/DIG. 5; 429/17; 429/19

(58) Field of Classification Search ........................ 96/4, 96/11; 95/55, 56; 55/DIG. 5; 429/17, 19
See application file for complete search history.

(56) References Cited

U.S. PATENT DOCUMENTS 5,259,870 A    11/1993    Edlund (Continued)

FOREIGN PATENT DOCUMENTS

EP    0 652 042 A1    5/1995

(Continued)

OTHER PUBLICATIONS

Edlund, David J., et al., "The Relationship Between Intermetallic Diffusion and Flux Decline in Composite-Metal Membranes: Implications for Achieving Long Membrane Lifetime," Journal of Membrane Science, vol. 107, 147-153 pp (1995).

*Primary Examiner*—Jason M Greene
(74) *Attorney, Agent, or Firm*—Oliff & Berridge, PLC (57) ABSTRACT

A hydrogen permeable membrane (10) for selectively allowing hydrogen to permeate therethrough includes a metal base layer (12) containing vanadium (V), a metal coating layer (16) containing palladium (Pd), and an intermediate layer (14) that is formed between the metal base layer (12) and the metal coating layer (16) and made of a metal having a higher melting point than the metal base layer (12) and the metal coating layer (16) and possessing hydrogen permeability.

16 Claims, 6 Drawing Sheets

U.S. PATENT DOCUMENTS

| | | | |
|---|---|---|---|
| 5,393,325 A | | 2/1995 | Edlund |
| 6,126,726 A | * | 10/2000 | Foley et al. ............ 96/11 |
| 6,461,408 B2 | * | 10/2002 | Buxbaum ............... 95/56 |
| 6,740,432 B1 | * | 5/2004 | Shimanuki et al. ........ 429/13 |
| 7,018,446 B2 | * | 3/2006 | Alvin et al. ............ 95/56 |
| 7,125,440 B2 | * | 10/2006 | Bossard et al. .......... 96/11 |
| 7,255,726 B2 | * | 8/2007 | Ma et al. .............. 95/56 |
| 2003/0061937 A1 | * | 4/2003 | Ito et al. .............. 96/11 |
| 2004/0129135 A1 | | 7/2004 | Roark et al. |

FOREIGN PATENT DOCUMENTS

| | | | |
|---|---|---|---|
| EP | 1 300 188 A2 | | 4/2003 |
| JP | A 07-185277 | | 7/1995 |
| JP | A 2001-286742 | | 10/2001 |
| JP | A 2002-126474 | | 5/2002 |
| JP | A 2003-112020 | | 4/2003 |
| JP | A 2003-74070 | | 3/2004 |
| JP | A 2004-146337 | | 5/2004 |
| JP | 2004-344731 | * | 12/2004 |
| WO | WO 03/076050 A1 | | 9/2003 |

\* cited by examiner

HYDROGEN PERMEABLE MEMBRANE, FUEL CELL AND HYDROGEN EXTRACTING APPARATUS EQUIPPED WITH THE HYDROGEN PERMEABLE MEMBRANE, AND METHOD OF MANUFACTURING THE HYDROGEN PERMEABLE MEMBRANE

FIELD OF THE INVENTION

The invention relates to a hydrogen permeable membrane for selectively allowing hydrogen to permeate therethrough, a fuel cell and a hydrogen extracting apparatus equipped with the hydrogen permeable membrane, and a method of manufacturing the hydrogen permeable membrane.

BACKGROUND OF THE INVENTION

In order to extract hydrogen from a hydrogen-containing gas, a hydrogen permeable membrane provided with a layer containing a hydrogen permeable metal has been used. For example, there is known a hydrogen permeable membrane having a five-layer structure in which hydrogen permeable metal coating layers containing palladium (Pd) or the like are provided on both faces of a hydrogen permeable metal base layer made of vanadium (V) or the like via hydrogen permeable intermediate layers made of a ceramic material or the like, respectively (Japanese Patent Publication No. 7-185277 A). In the hydrogen permeable membrane thus constructed, by providing the hydrogen permeable intermediate layers, hydrogen permeability is prevented from deteriorating due to diffusion of a metal coating into the metal base layer.

However, the hydrogen permeable intermediate layers made of the ceramic material as described above allow hydrogen in a molecular state to permeate therethrough. Thus, when hydrogen moves between the hydrogen permeable metal base layer and the hydrogen permeable intermediate layers or between the hydrogen permeable metal coating layers and the hydrogen permeable intermediate layers, a dissociative or recombination reaction of hydrogen is required. This prevents the hydrogen permeation performance in the entire hydrogen permeable membrane from improving.

DISCLOSURE OF THE INVENTION

It is an object of the invention to prevent diffusion of a metal in a hydrogen permeable membrane without causing a dissociative reaction or a recombination reaction of hydrogen.

A first aspect of the invention relates to a hydrogen permeable membrane for selectively allowing hydrogen to permeate therethrough. This hydrogen permeable membrane includes a metal base layer containing vanadium (V), a metal coating layer containing palladium (Pd), and an intermediate layer that is formed between the metal base layer and the metal coating layer and is made of a metal having a higher melting point than the metal base layer and the metal coating layer and possessing hydrogen permeability.

According to the hydrogen permeable membrane constructed as described above, by providing the intermediate layer between the metal base layer and the metal coating layer, diffusion of the metal between the metal base layer and the metal coating layer can be suppressed, and the performance of the hydrogen permeable membrane can be prevented from deteriorating as a result of diffusion of the metal. Since the intermediate layer is made of the metal possessing hydrogen permeability, the dissociative reaction or recombination reaction of hydrogen is not required when hydrogen moves between the metal base layer and the intermediate layer and between the intermediate layer and the metal coating layer. Accordingly, the hydrogen permeation performance of the entire hydrogen permeable membrane can be restricted from deteriorating due to the provision of the intermediate layer. Further, since the intermediate layer is made of the metal having a higher melting point than the metal base layer and the metal coating layer, the effect of suppressing diffusion of the metal between the metal base layer and the metal coating layer can further be enhanced.

The metal constituting the intermediate layer may be composed of a single metal element.

In this construction, the effect of preventing diffusion of the metal between the metal base layer and the metal coating layer can be achieved through a simple structure. The metal element may be tantalum (Ta) or niobium (Nb).

The metal constituting the intermediate layer may be an alloy.

In this construction, since the intermediate layer is made of the alloy, the swell of the intermediate layer at the time when hydrogen solidly dissolves into the hydrogen permeable membrane can be suppressed, the durability of the entire hydrogen permeable membrane can be enhanced, and the hydrogen permeable membrane can be prevented from deteriorating. The alloy may be a solid solution, an intermetallic compound, or a mixture of them.

The intermediate layer may be made of an alloy that is composed of a base metal having a higher melting point than the metal base layer and the metal coating layer and an additive metal. A metal of group V can be used as the base metal having a higher melting point than the metal base layer and the metal coating layer.

The additive metal may be vanadium (V) or palladium (Pd).

If V is used as the additive metal, the hydrogen permeation performance in the metal base layer can be prevented from deteriorating as a result of diffusion of the additive metal into the metal base layer. If Pd is used as the additive metal, the hydrogen permeation performance in the metal coating layer can be prevented from deteriorating as a result of diffusion of the additive metal into the metal coating layer.

The intermediate layer may include a first intermediate layer that is in contact with the metal base layer and a second intermediate layer that is in contact with the metal coating layer. The first intermediate layer may contain vanadium (V) as the additive metal. The second intermediate layer may contain palladium (Pd) as the additive metal.

In this construction, the effect of preventing the hydrogen permeation performance in the metal base layer from deteriorating as a result of diffusion of the additive metal into the metal base layer and the effect of preventing the hydrogen permeation performance in the metal coating layer from deteriorating as a result of diffusion of the additive metal into the metal coating layer can be achieved.

The additive metal may contain at least one metal selected from cobalt (Co), nickel (Ni), copper (Cu), molybdenum (Mo), and titanium (Ti).

In this construction, the hydrogen permeation performance in the metal base layer can be prevented from deteriorating as a result of diffusion of the additive metal into the metal base layer.

Alternatively, the additive metal may contain at least one metal selected from silver (Ag), gadolinium (Gd), yttrium (Y), and platinum (Pt).

In this construction, the hydrogen permeation performance in the metal coating layer can be prevented from deteriorating as a result of diffusion of the additive metal into the metal coating layer.

The intermediate layer may include a first intermediate layer that is in contact with the metal base layer and a second intermediate layer that is in contact with the metal coating layer. The first intermediate layer may contain, as the additive metal, at least one metal selected from cobalt (Co), nickel (Ni), copper (Cu), manganese (Mn), and titanium (Ti). The second intermediate layer may contain, as the additive metal, at least one metal selected from silver (Ag), gadolinium (Gd), yttrium (Y), and platinum (Pt).

In this construction, the effect of preventing the hydrogen permeation performance in the metal base layer from deteriorating as a result of diffusion of the additive metal into the metal base layer and the effect of preventing the hydrogen permeation performance in the metal coating layer from deteriorating as a result of diffusion of the additive metal into the metal coating layer can be achieved.

The invention can be realized in various forms other than the aforementioned ones. For instance, the invention can be realized in the form of a method of manufacturing a hydrogen permeable membrane, a hydrogen separation system utilizing a hydrogen permeable membrane, a fuel cell utilizing a hydrogen permeable membrane, or the like.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Next, embodiments of the invention will be described in the following order.

Figure 1:
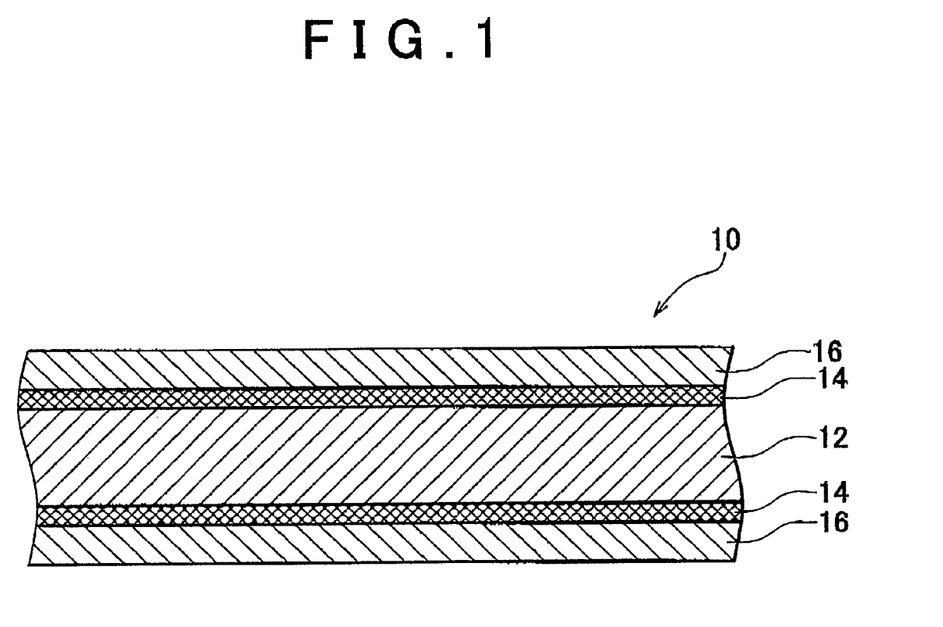
FIG. 1 is a schematic sectional view showing an outline of a construction of a hydrogen permeable membrane 10.

A. Structure of Hydrogen Permeable Film
B. Method of Manufacturing Hydrogen Permeable Film
C. Other Embodiments
D. Apparatus employing Hydrogen Permeable Film
E. Modification Examples A. Structure of Hydrogen Permeable Film FIG. 1 is a schematic sectional view showing an outline of a construction of a hydrogen permeable membrane 10 as the first embodiment. The hydrogen permeable membrane 10 has a five-layer structure incorporating a metal base layer 12, intermediate layers 14 formed on both faces of the metal base layer 12, and metal coating layers 16 formed on the respective intermediate layers 14.

The metal base layer 12 is made of vanadium (V) or a metal containing vanadium (V) such as a vanadium alloy containing 50% or more of V as a main constituent, and possesses excellent hydrogen permeability.

The metal coating layers 16 are made of palladium (Pd) or a metal containing palladium (Pd) such as a palladium alloy containing 50% or more of Pd as a main constituent. The metal coating layers 16 function as catalyst layers that are active enough to promote a dissociative reaction of hydrogen molecules on a surface of the hydrogen permeable membrane or a combination reaction of the hydrogen molecules.

The intermediate layers 14 are made of a metal possessing hydrogen permeability and having a higher melting point than the metal constituting the metal base layer 12 and the metal constituting the metal coating layers 16. The intermediate layers 14 of this embodiment are made of tantalum (Ta). The intermediate layers 14 are provided to prevent diffusion of the metals between the metal base layer 12 and the metal coating layers 16. Instead of being made of Ta, the intermediate layers 14 may also be made of niobium (Nb), which is a metal possessing hydrogen permeability and having a higher melting point than the metal constituting the metal base layer 12 and the metal constituting the metal coating layers 16. Both niobium (Nb) and Ta belong to a metal of group V.

B. Method of Manufacturing Hydrogen Permeable Film

Figure 2:
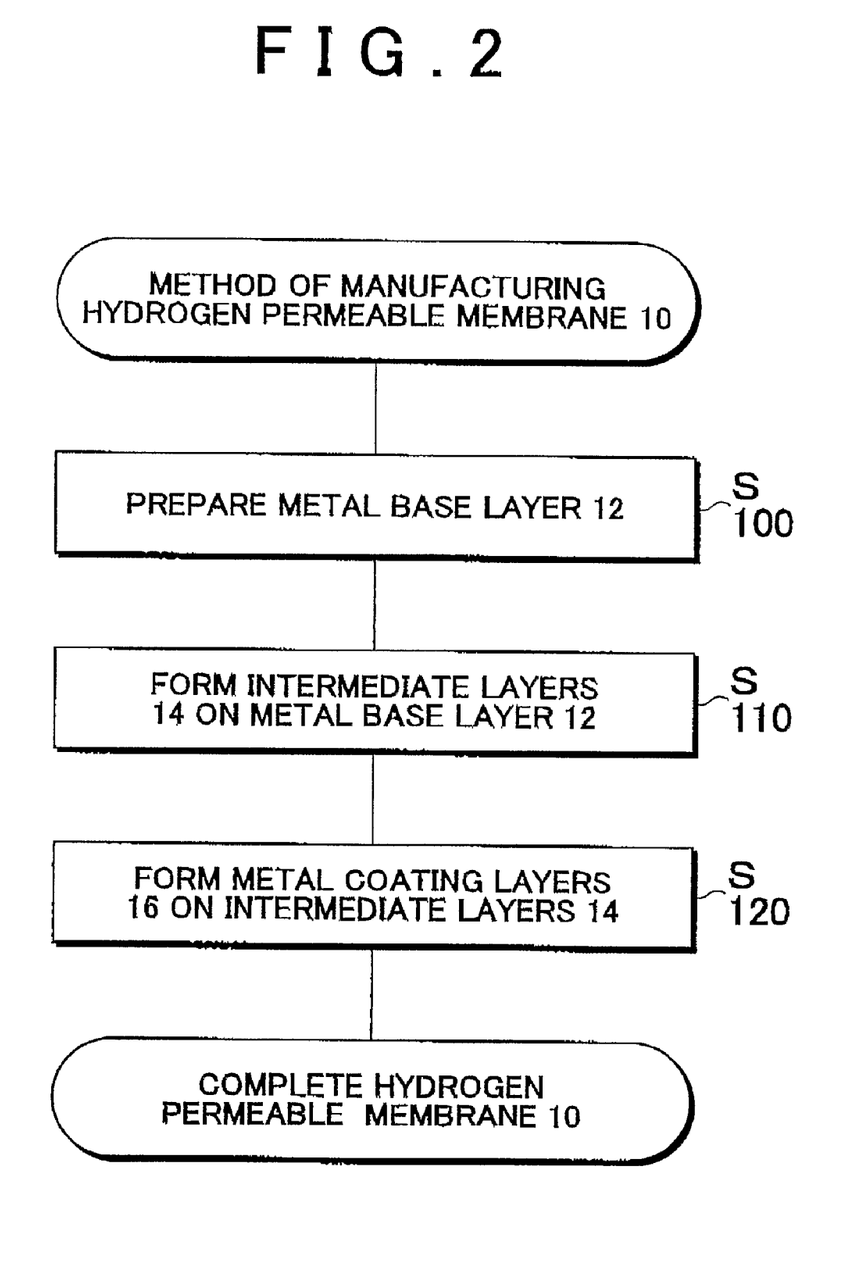
FIG. 2 is a process chart showing a method of manufacturing the hydrogen permeable membrane 10.

FIG. 2 is a process chart showing a method of manufacturing the hydrogen permeable membrane 10. In manufacturing the hydrogen permeable membrane 10, a metal layer containing V as the metal base layer 12 is first prepared (a step S100). In this step S100, a surface of the prepared metal base layer 12 is etched using an alkaline solution, whereby impurities such as an oxide film formed on the surface are removed.

Subsequently to the step S100, the intermediate layers 14 made of Ta are formed on respective faces of the prepared metal base layer 12 (a step S110). The intermediate layers 14 can be formed by means of, for example, a plating treatment such as electroless plating or electrolytic plating, a PVD method, or a CVD method. After that, the metal coating layers 16 containing Pd are formed on the respective intermediate layers 14 (a step S120), so that the hydrogen permeable membrane is completed. The metal coating layers 16 can be formed by means of, for example, a plating treatment such as electroless plating or electrolytic plating, the PVD method, or the CVD method.

In manufacturing the hydrogen permeable membrane 10, thicknesses of the respective layers may be set according to a required hydrogen permeation performance and a required strength, which are determined on the basis of an intended purpose. For instance, the metal base layer 12 may have a thickness of 10 to 100 μm. The metal coating layers 16 may have a thickness of 0.1 to 10 μm. Since the metal coating layers 16 function as catalyst layers as described already, they can be made thinner than the metal base layer 12. Since the intermediate layers have only to be interposed between the metal base layer 12 and the metal coating layers 16 to prevent diffusion of the metals therebetween, they may be made thinner than the metal coating layers 16. For instance, the intermediate layers may be 0.01 to 10 μm in thickness.

According to the hydrogen permeable membrane 10 of this embodiment, by providing the intermediate layers 14 made of the metal possessing hydrogen permeability, it is possible to suppress diffusion of the metals between the metal base layer 12 and the metal coating layers 16 and prevent the performance of the hydrogen permeable membrane from deteriorating as a result of diffusion of the metals. As is the case with the metal base layer 12 or the metal coating layers 16, the intermediate layers 14 are made of a metal that allows hydrogen as hydrogen atoms (or protons) to permeate therethrough. Therefore, when hydrogen moves between the metal base layer 12 and the intermediate layers 14 and between the intermediate layers 14 and the metal coating layers 16, the dissociative reaction or the combination reaction of hydrogen molecules is not required. Accordingly, it is possible to restrain the hydrogen permeation performance of the entire hydrogen permeable membrane from deteriorating due to the provision of the intermediate layers 14. Since the intermediate layers 14 are made of a metal having a higher melting point than the metal base layer 12 and the metal coating layers 16, the effect of suppressing diffusion of the metals between the metal base layer 12 and the metal coating layers 16 can further be enhanced. In general, the higher the melting point of a metal is, the more unlikely diffusion thereof is. Thus, by forming the intermediate layers with an alloy having a higher melting point than the metal base layer 12 and the metal coating layers 16, the effect of suppressing diffusion of the metals can further be enhanced.

A result of an experiment conducted to inspect the performance of the hydrogen permeable membrane 10 of this embodiment will now be described. In this experiment, performance of the hydrogen permeable membrane 10 of this embodiment is compared with performance of a hydrogen permeable membrane as a comparative example in which the intermediate layers 14 are not provided with is made. Concrete conditions for the hydrogen permeable membrane 10 and the hydrogen permeable membrane as the comparative example in the result of the experiment will be described hereinafter. The hydrogen permeable membrane 10 has a five-layer structure shown in FIG. 1, and the hydrogen permeable membrane as the comparative example has a three-layer structure in which both faces of the metal base layer 12 are covered with the metal coating layers 16. In this example of the experiment, the intermediate layers 14 are formed by electron beam evaporation as PVD.

Figure 3:
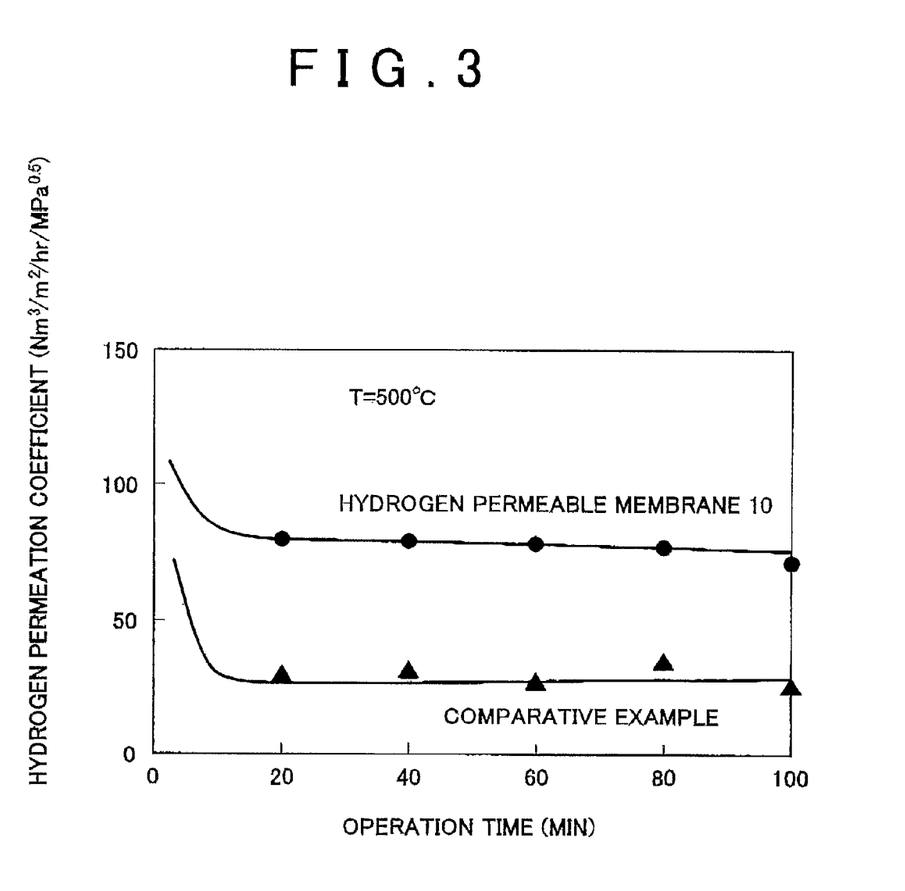
FIG. 3 is an explanatory diagram showing a result of an experiment conducted to inspect time-dependent changes in hydrogen permeation coefficient.

The hydrogen permeable membrane 10; the metal base layer 12 (a V layer with a thickness of 100 μm), the intermediate layers 14 (Ta layers with a thickness of 0.03 μm), the metal coating layers 16 (Pd layers with a thickness of 0.1 μm):

Comparative Example; the metal base layer 12 (a V layer with a thickness of 100 μm), the intermediate layers 14 (not provided), the metal coating layers 16 (Pd layers with a thickness of 0.1 μm):

As regards each of these two kinds of hydrogen permeable membrane, while causing hydrogen gas at 0.2 MPa to flow along one face and hydrogen gas at 0.1 MPa to flow along the other face under the condition of a temperature of 500° C., a hydrogen permeation coefficient was calculated and time-dependent changes in the hydrogen permeation coefficient were inspected. A result of this experiment is shown in FIG. 3. As shown in FIG. 3, the hydrogen permeable membrane 10 having the intermediate layers 14 possessed a higher hydrogen permeation coefficient than the hydrogen permeable membrane as the comparative example in which the intermediate layers 14 are not provided, regardless of an elapsed time (an operation time in which the hydrogen permeable membranes are exposed to hydrogen current). In other words, as a result of exposing the respective hydrogen permeable membranes to hydrogen current under the aforementioned conditions and calculating their hydrogen permeation coefficients every 20 minutes, the hydrogen permeable membrane 10 possessed a stable hydrogen permeation coefficient approximately at 75 ($Nm^3/m^2/hr/MPa^{0.5}$). On the other hand, the hydrogen permeable membrane 10 as the comparative example possessed a hydrogen permeation coefficient of about 25 ($Nm^3/m^2/hr/MPa^{0.5}$). Thus, it has been revealed that the provision of the intermediate layers 14 makes it possible to maintain a higher hydrogen permeation coefficient in the hydrogen permeable membrane.

C. Other Embodiments

In the first embodiment, the intermediate layers 14 are made of a single metal element. However, the intermediate layers 14 may be made of an alloy possessing hydrogen permeability and having a higher melting point than the metal base layer 12 and the metal coating layers 16. Such constructions will be described hereinafter as the second to seventh embodiments.

C-1. Second Embodiment

As in the case of the first embodiment, a hydrogen permeable membrane of the second embodiment has the five-layer structure shown in FIG. 1. In the hydrogen permeable membrane of the second embodiment, the intermediate layers 14 are made of an alloy (Ta-V alloy) containing tantalum (Ta) as a base metal and vanadium (V) as an additive metal. Ta itself possesses hydrogen permeability and has a higher melting point than V and Pd. The alloy obtained by alloying Ta using V as the additive metal also possesses hydrogen permeability, has a higher melting point than V and Pd, and has a higher melting point than the metal constituting the metal base layer 12 and the metal constituting the metal coating layers 16. The hydrogen permeable membrane of the second embodiment and later-described hydrogen permeable membranes of the third to seventh embodiments can also be manufactured in the same manner as the hydrogen permeable membrane of the first embodiment. For instance, in order to manufacture the hydrogen permeable membrane of the second embodiment, it is appropriate to form a Ta-V alloy layer by means of, for example, a plating treatment such as electroless plating or electrolytic plating, the PVD method, or the CVD method in the step S110 of the manufacturing process shown in FIG. 2.

According to the thus-constructed hydrogen permeable membrane 10 of the second embodiment, the following effects are achieved in addition to an effect similar to that of the first embodiment. In other words, according to the hydrogen permeable membrane 10 of the second embodiment, since the intermediate layers 14 are made of the alloy, it is possible to suppress hydrogen swell in the intermediate layers 14, enhance durability of the entire hydrogen permeable membrane 10, and prevent the performance of the hydrogen permeable membrane 10 from deteriorating. A metal possessing hydrogen permeability generally has a nature of swelling at the time of solid dissolution of hydrogen (hereinafter referred to as hydrogen swell), but an alloy possesses a smaller degree of hydrogen swell than a simple metal. According to the second embodiment, therefore, it is possible to restrain durability of the hydrogen permeable membrane from deteriorating as a result of hydrogen swell of the intermediate layers 14.

Ta has a greater degree of hydrogen swell than the metal base layer 12 containing V and the metal coating layer 16 containing Pd, but a Ta-V alloy has a smaller degree of hydrogen swell than Ta. According to the second embodiment, therefore, a difference in the degree of hydrogen swell between the intermediate layer 14 and the metal base layer 12 or the metal coating layer 16 adjacent thereto is smaller than that of the first embodiment, and it is possible to restrain durability of the hydrogen permeable membrane from deteriorating as a result of a difference in hydrogen swell coefficient between the adjacent layers. Accordingly, the hydrogen permeable membrane of the second embodiment can make a further improvement in durability than that of the first embodiment.

According to the hydrogen permeable membrane 10 of this embodiment, as the alloy constituting the intermediate layers 14, V, which is identical in type to the metal constituting the metal base layer 12, is used as an additive metal added to Ta as a base metal. Therefore, the effect of preventing the performance of the hydrogen permeable membrane from deteriorating as a result of diffusion of the metals can further be enhanced. Diffusion of the metals generally progresses from a high-concentration side to a low-concentration side. Therefore, V is hardly diffused from the intermediate layers with a low concentration of V to the metal base layer 12 with a high concentration of V. Thus, by using V, which is the metal constituting the metal base layer 12, as the additive metal, it is possible to prevent the hydrogen permeation performance in the metal base layer 12 from deteriorating as a result of diffusion of the additive metal constituting the intermediate layers into the metal base layer 12. Even if V has diffused from the intermediate layers toward the metal base layer 12, the hydrogen permeation performance of the metal base layer 12 does not deteriorate because V is identical in type to the metal constituting the metal base layer 12.

C-2. Third Embodiment

Although V is used as the additive metal contained in the alloy constituting the intermediate layers 14 in the second embodiment, Pd may be used instead of V. In other words, in the hydrogen permeable membrane 10 shown in FIG. 1, the intermediate layers 14 may also be made of an alloy containing Ta as a base metal and Pd as an additive metal.

The hydrogen permeable membrane of the third embodiment as described above can also achieve an effect similar to that of the second embodiment. In other words, diffusion of the metals between the metal base layer and the metal coating layers can be prevented by providing the intermediate layers. Since the dissociative reaction or the combination reaction of hydrogen molecules is not required when hydrogen moves between the respective layers, it is possible to restrain the hydrogen permeation performance of the entire hydrogen permeable membrane from deteriorating due to the provision of the intermediate layers. By constituting the intermediate layers with a metal having a higher melting point than the metal base layer 12 and the metal coating layers 16, the effect of preventing diffusion of the metals can be enhanced. In addition, by constituting the intermediate layers with an alloy, it is possible to suppress hydrogen swell in the intermediate layers, restrain the hydrogen permeation performance in the hydrogen permeable membrane from deteriorating, and enhance durability of the hydrogen permeable membrane.

Moreover, by using Pd as the additive metal contained in the intermediate layers 14, the effect of preventing the performance of the hydrogen permeable membrane from deteriorating as a result of diffusion of the metals can further be enhanced. In other words, since diffusion of the metals from the intermediate layers with a low concentration of Pd to the metal coating layers 16 with a high concentration of Pd is unlikely to occur, it is possible to prevent the hydrogen permeation performance in the metal coating layers 16 from deteriorating as a result of diffusion of the additive metal constituting the intermediate layers to the metal coating layers 16. Even if Pd has diffused from the intermediate layers to the metal coating layers 16, the hydrogen permeation performance of the metal coating layers 16 does not deteriorate because Pd is identical in type to the metal constituting the metal coating layers 16.

C-3. Fourth Embodiment

In the hydrogen permeable membrane 10 shown in FIG. 1, the intermediate layers 14 are constituted by the additive metal and Ta as the base metal. The additive metal may contain at least one metal selected from cobalt (Co), nickel (Ni), copper (Cu), molybdenum (Mo), and titanium (Ti). This construction also makes it possible to achieve an effect similar to that of the second embodiment. In addition, even if the aforementioned metals listed as additive metals have diffused into V, they are unlikely to cause a deterioration in the hydrogen permeation performance of V. Therefore, by using the aforementioned metals as additive metals, it is possible to prevent the hydrogen permeation performance of the entire hydrogen permeable membrane from deteriorating as a result of diffusion of the additive metal into the metal base layer 12.

C-4. Fifth Embodiment

In the hydrogen permeable membrane 10 shown in FIG. 1, the intermediate layers 14 are constituted by the additive metal and Ta as the base metal. The intermediate layers 14 may contain at least one metal selected from silver (Ag), gadolinium (Gd), yttrium (Y), and platinum (Pt). In this construction as well, an effect similar to that of the second embodiment is achieved. Furthermore, the aforementioned metals listed as the additive metals have a nature of enhancing hydrogen permeation performance of Pd by being alloyed with Pd. Therefore, by using the aforementioned metals as the additive metals, the hydrogen permeation performance of the entire hydrogen permeable membrane can be prevented from deteriorating as a result of diffusion of the additive metals into the metal coating layers 16.

C-5. Sixth Embodiment

Figure 4:
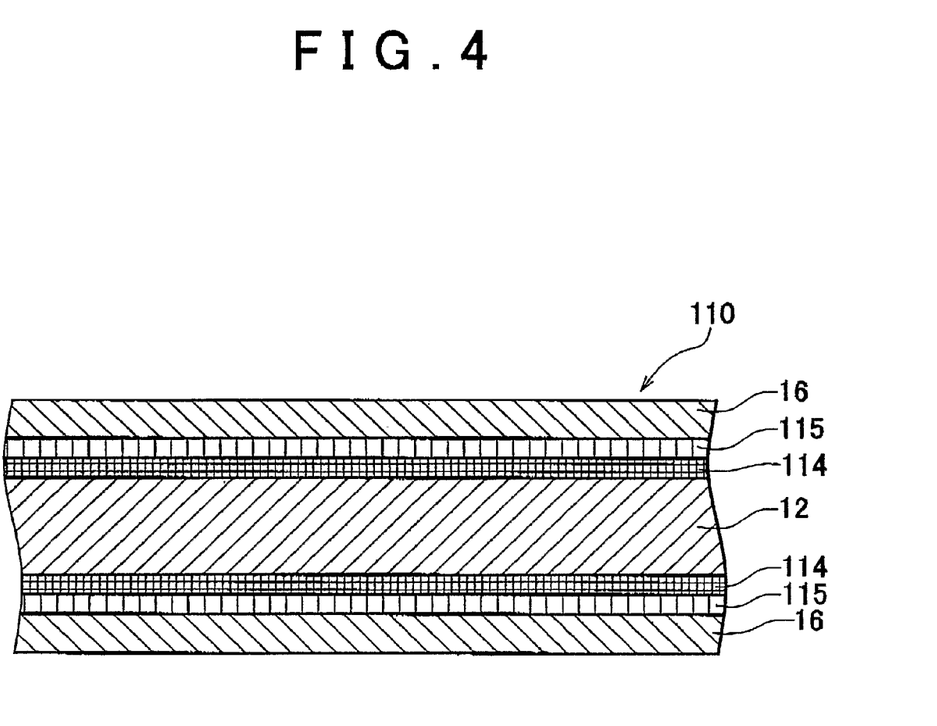
FIG. 4 is a schematic sectional view showing an outline of a construction of a hydrogen permeable membrane 110.

FIG. 4 is a schematic sectional view showing an outline of a construction of a hydrogen permeable membrane 110 of the sixth embodiment. The hydrogen permeable membrane 110 has a seven-layer structure in which first intermediate layers 114 and second intermediate layers 115 are interposed between the metal base layer 12 and the metal coating layers 16 respectively, which are similar to those of the hydrogen permeable membrane 10 of the second embodiment. The first intermediate layers 114, which are formed on both the faces of the metal base layer 12, are made of an alloy of Ta as a base metal and V as an additive metal, as is the case with the intermediate layers 14 provided in the hydrogen permeation membrane 10 of the second embodiment. The second intermediate layers 115, which are formed between the first intermediate layers 114 and the metal coating layer 16 respectively, are made of Ta as a base metal and Pd as an additive metal, as is the case with the intermediate layers provided in the hydrogen permeable membrane of the third embodiment.

In this construction as well, the above-stated effect resulting from the intermediate layers made of a high melting point alloy possessing hydrogen permeability is achieved. In addition, by providing the first intermediate layers 114 containing V as an additive metal, the hydrogen permeation performance can be restrained from deteriorating as a result of diffusion of the additive metal into the metal base layer 12, as is the case with the second embodiment. Further, by providing the second intermediate layers 115 containing Pd as an additive metal, the hydrogen permeation performance can be prevented from deteriorating as a result of diffusion of the additive metal into the metal coating layers 16, as is the case with the third embodiment.

C-6. Seventh Embodiment

In the hydrogen permeable membrane 110 shown in FIG. 4, at least one metal selected from Co, Ni, Cu, Mo, and Ti may be used as the additive metal contained in the first intermediate layers 114 as is the case with the fourth embodiment, and at least one metal selected from Ag, Gd, Y, and Pt may be used as the additive metal contained in the second intermediate layers 115 as is the case with the fifth embodiment. In this construction as well, the above-stated effect resulting from the intermediate layers made of a high melting point alloy possessing hydrogen permeability is achieved. Furthermore, by providing the intermediate layers 114 containing at least one of Co, Ni, Cu, Mo, and Ti as an additive metal, the hydrogen permeation performance can be restrained from deteriorating as a result of diffusion of the additive metal into the metal base layer 12, as is the case with the fourth embodiment. Further, by providing the second intermediate layers 115 containing at least one of Ag, Gd, Y, and Pt as an additive metal, the hydrogen permeation performance can be prevented from deteriorating as a result of diffusion of the additive metal into the metal coating layers 16, as is the case with the fifth embodiment.

It is also possible to adopt a construction in which the combination of the first and second intermediate layers in the sixth embodiment and the combination of the first and second intermediate layers in the seventh embodiment are interchanged. In other words, the hydrogen permeable membrane may incorporate the first intermediate layers 114 of the sixth embodiment in which V is used as an additive metal and the second intermediate layers of the seventh embodiment in which at least one metal selected from Ag, Gd, Y, and Pt is used as an additive metal. Alternatively, the hydrogen permeable membrane may incorporate the first intermediate layers of the seventh embodiment in which at least one metal selected from Co, Ni, Cu, Mo, and Ti is used as an additive metal and the second intermediate layers 115 of the sixth embodiment in which Pd is used as an additive metal. In these cases as well, the above-stated effects corresponding to the additive metals used are achieved respectively.

Figure 5:
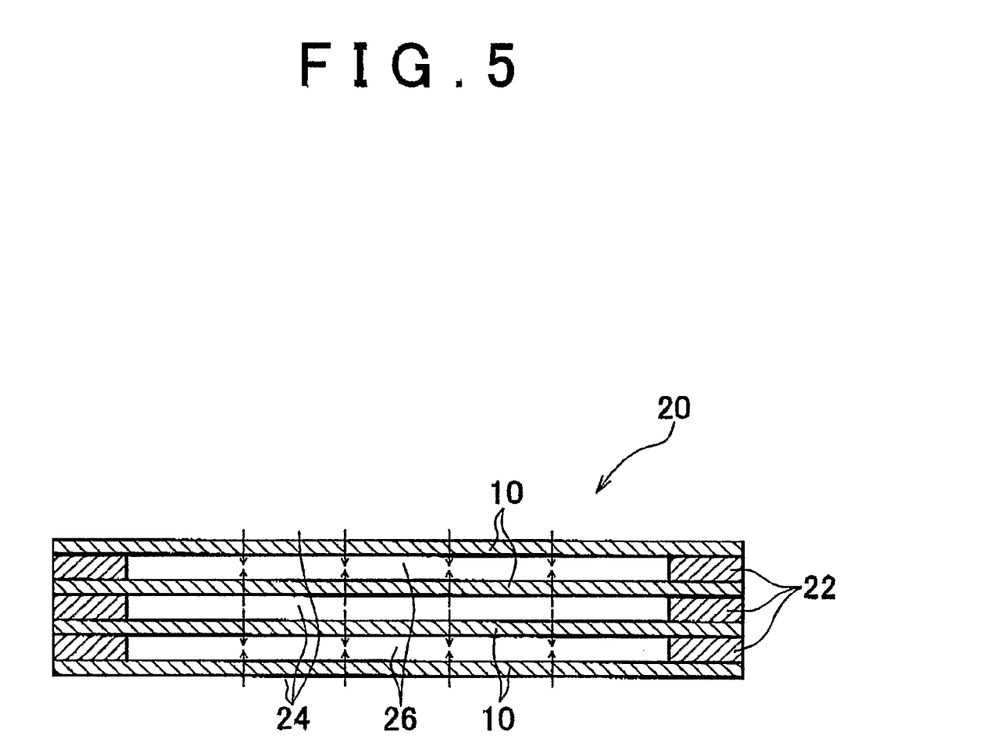
FIG. 5 is a schematic sectional view showing a construction of a hydrogen extracting apparatus 20.

D. Apparatus employing Hydrogen Permeable Film:

D-1. Hydrogen Extracting Apparatus:

FIG. 5 is a schematic sectional view showing a construction of a hydrogen extracting apparatus 20 utilizing the hydrogen permeable membrane 10 of the first embodiment. The hydrogen extracting apparatus 20 has a structure in which a plurality of hydrogen permeable membranes 10 are stacked. FIG. 5 shows only a construction relating to a stack of the hydrogen permeable membranes 10. In the hydrogen extracting apparatus 20, a support portion 22 joined to outer peripheral portion of the hydrogen permeable membrane 10 is disposed between the stacked hydrogen permeable membranes 10. A predetermined space is defined by the support portions 22 between the hydrogen permeable membranes 10. It is appropriate that the support portions 22 can be joined to the hydrogen permeable membranes 10 and possess sufficient rigidity. For example, if the support portions 22 are made of a metal material such as stainless steel (SUS), they can be easily joined to the hydrogen permeable membranes 10 as metal layers.

The aforementioned predetermined spaces formed among the respective hydrogen permeable membranes 10 alternately form hydrogen-containing gas passages 24 and purge gas passages 26. A hydrogen-containing gas, from which hydrogen is to be extracted, is supplied from a hydrogen-containing gas supply portion (not shown) to the respective hydrogen-containing gas passages 24. A purge gas with a sufficiently low concentration of hydrogen is supplied from a purge gas supply portion (not shown) to the respective purge gas passages 26. The hydrogen in the gas supplied to the hydrogen-containing gas passages 24 permeates through the hydrogen permeable membrane 10 toward the purge gas passages 26 in accordance with a difference in hydrogen concentration, and is thereby extracted from the hydrogen-containing gas.

By providing the hydrogen extracting apparatus 20 constructed as described above with the hydrogen permeable membrane 10 of the first embodiment, the hydrogen permeation performance can be prevented from deteriorating as a result of diffusion of the metal, and the performance of the hydrogen extracting apparatus 20 can be prevented from deteriorating. The hydrogen permeable membrane used for the hydrogen extracting apparatus 20 may be that of any one of the other embodiments. In this case, by forming the intermediate layers of the hydrogen permeable membrane of each of the embodiments out of an alloy, the durability and hydrogen permeation performance can be restricted from deteriorating as a result of hydrogen swell, and the above-stated effect corresponding to an additive metal contained in the intermediate layers is achieved.

Figure 6:
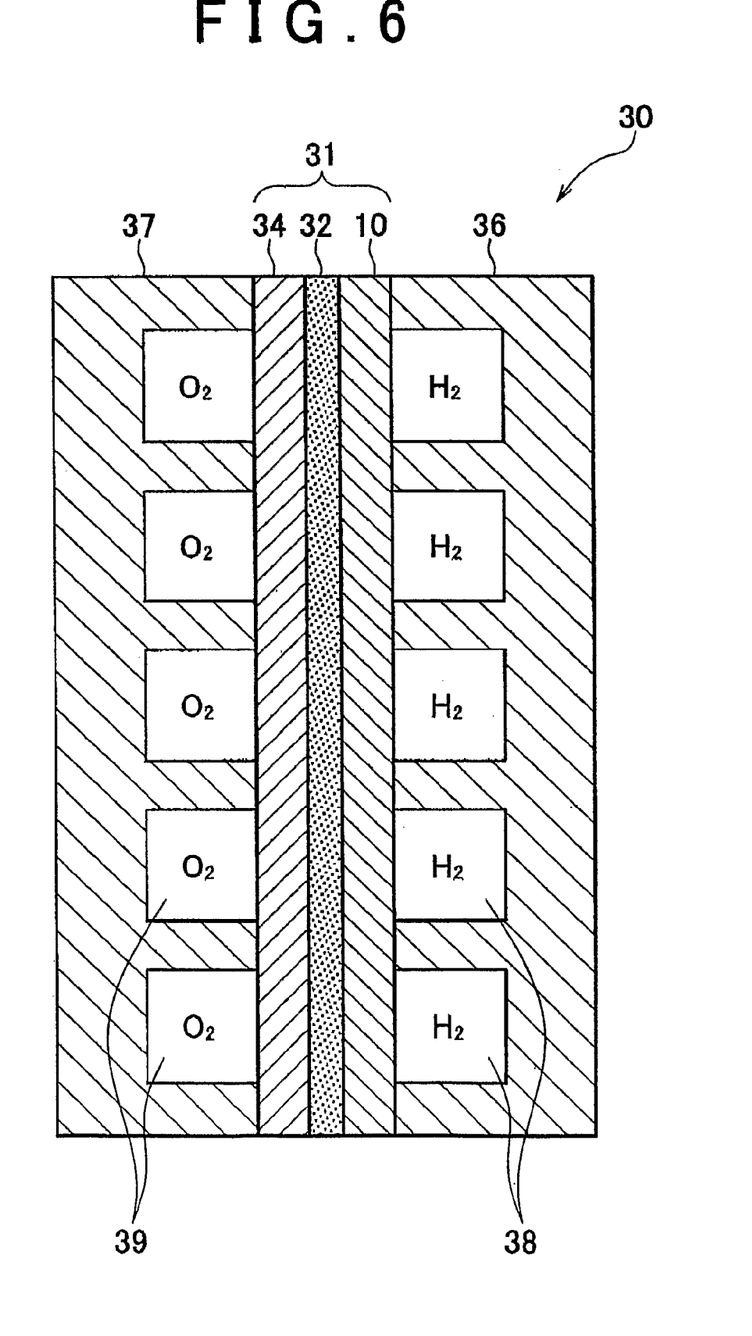
FIG. 6 is a schematic sectional view showing an example of a construction of a fuel cell utilizing a hydrogen permeable membrane.

D-2. Fuel Cell:

FIG. 6 is a schematic sectional view showing an example of a construction of a fuel cell utilizing the hydrogen permeable membrane 10 of the first embodiment. Although FIG. 6 shows a single cell 30, a fuel cell is formed by stacking a plurality of single cells 30.

The single cell 30 is provided with an MEA (Membrane Electrode Assembly) 31, which is composed of the hydrogen permeable membrane 10, an electrolyte layer 32 formed on one face of the hydrogen permeable membrane 10, and a cathode electrode 34 formed on the electrolyte layer 32. The single cell 30 is further provided with two gas separators 36 and 37, which sandwich the MEA 31 from both sides thereof. In-single-cell fuel gas flow passages 38 through which a fuel gas containing hydrogen passes are formed between the hydrogen permeable membrane 10 and the gas separator 36 adjacent thereto. In-single-cell oxidative gas flow passages 39 through which an oxidative gas containing oxygen passes are formed between the cathode electrode 34 and the gas separator 37 adjacent thereto.

The electrolyte layer 32 is a layer made of a solid electrolyte possessing proton conductivity. For instance, a ceramics proton conductor of $BaCeO_3$ or $SrCeO_3$ type can be used as the solid electrolyte constituting the electrolyte layer 32. The electrolyte layer 32 can be formed on the hydrogen permeable membrane 10 through generation of the aforementioned solid oxide. For instance, various methods such as PVD and CVD can be used as methods of forming the electrolyte layer 32. By thus forming the electrolyte layer 32 on the hydrogen permeable membrane 10 as a dense metal film, the electrolyte layer 32 can be reduced in thickness and can further be reduced in film resistance. Thus, power generation can be carried out approximately at 200 to 600° C., which is lower than an operating temperature of the solid-oxide fuel cell of the related art.

The cathode electrode 34 is a layer possessing catalytic activity for promoting an electrochemical reaction. In this embodiment, a porously formed Pt layer made of Pt as a noble metal is provided as the cathode electrode 34. In the single cell 30, a collector portion possessing electrical conductivity and gas permeability is further provided between the cathode electrode 34 and the gas separator 37 or between the hydrogen permeable membrane 10 and the gas separator 36. The collector portion can be formed of a plate material of, for example, a porous foam metal or a metal mesh, carbon cloth, carbon paper, a ceramic material, or the like.

The gas separators 36 and 37 are members impermeable to gas, which are formed of a conductive material such as carbon or a metal. On a surface of the gas separator 36 or 37, predetermined concavities and convexities which constitute the in-single-cell fuel gas flow passage 38 or the in-single-cell oxidative gas flow passage 39 are formed. In an actual fuel cell, the gas separators 36 and 37 are not constructed as different kinds of members. The in-single-cell fuel gas flow passage 38 of a predetermined single cell 30 is formed in a face of one of the gas separators 36 and 37, and the in-single-cell oxidative gas flow passage 39 of a single cell 30 adjacent to the aforementioned predetermined single cell 30 is formed in a face of the other. Alternatively, between adjacent single cells 30, a cooling medium flow passage may be provided between the gas separator 36 provided in one of the single cells and the gas separator 37 provided in the other single cell.

By providing the fuel cell described above with the hydrogen permeable membrane 10 of the first embodiment, the hydrogen permeation performance can be prevented from deteriorating as a result of diffusion of the metal, and the performance of the fuel cell can be prevented from deteriorating. The hydrogen permeable membrane of any one of the other embodiments may be used for the fuel cell. In this case, by forming the intermediate layers of the hydrogen permeable membrane of each of the embodiments out of an alloy, the durability and hydrogen permeation performance can be restricted from deteriorating as a result of hydrogen swell, and the above-stated effect corresponding to the additive metal contained in the intermediate layers can be achieved.

Unlike the hydrogen permeable membrane 10 shown in FIG. 1, the hydrogen permeable membrane provided in the fuel cell shown in FIG. 6 may also be constructed such that its face that is in contact with the electrolyte layer 32 is not provided with a metal coating layer or an intermediate layer.

E. Modification Examples

The invention is not limited to the aforementioned embodiments and can be carried out in various modes as long as it does not depart from the gist thereof. For example, the following modifications are possible as well.

E1. Modification Example 1

Although the base metal constituting the intermediate layers is Ta in the above-mentioned second to seventh embodiments, other metals may be used as base metals. For instance, niobium (Nb), which belongs to metal of group V as is the case with Ta, possesses hydrogen permeability, and has a higher melting point than V and Pd, may be used as the base metal instead of Ta. In the case where intermediate layers having a higher melting point than the metal base layer 12 and the metal coating layers 16 and possessing hydrogen permeability are formed by alloying V, which belongs to metal of group V, with a predetermined additive metal, V and the predetermined additive metal can be used together as the base metals constituting the intermediate layers. The base metal is not limited to metal of group V such as Nb or Ta. Any metal can be used by being alloyed with an additive metal as long as the resultant alloy has a higher melting point than the metal base layer containing V and the metal coating layers containing Pd and possesses hydrogen permeation performance. An effect similar to those of the embodiments can thereby be achieved. The ratio of the base metal to the entire alloy constituting the intermediate layers may be appropriately set within a range exceeding 50%, such that the hydrogen permeation performance and the melting point of the obtained alloy are sufficiently enhanced in accordance with the additive metal to be combined with the base metal.

E2. Modification Example 2

The additive metal constituting the intermediate layers may not be those mentioned in the respective embodiments. Any additive metal may be used by being alloyed with a base metal as long as the resultant alloy has a higher melting point than the metal base layer and the metal coating layers and possesses hydrogen permeability. An effect similar to those of the embodiments can thereby be achieved. Apart from the metals mentioned in the embodiments, for example, tungsten (W) can be used as an additive metal. Alternatively, for example, Nb may be used when Ta is used as a base metal, or Ta may be used as an additive metal when Nb is used as a base metal.

By using a plurality of kinds of metals as additive metals constituting the intermediate layers, an effect corresponding to the metals to be combined with one another can be achieved as well. For instance, the metal selected from Co, Ni, Cu, Mo, and Ti to be used as the additive metal in the fourth embodiment and the metal selected from Ag, Gd, Y, and Pt to be used as the additive metal in the fifth embodiment may be combined with each other to be used as additive metals. In such a case, the effect of restraining the hydrogen permeation performance from deteriorating as a result of diffusion of the additive metals into the metal base layer 12 and the effect of preventing the hydrogen permeation performance from deteriorating as a result of diffusion of the additive metals into the metal coating layers 16 can be achieved. If an alloy obtained by combining a plurality of kinds of metals as additive metals results in a high melting point alloy possessing hydrogen permeability, any combination is possible.

E3. Modification Example 3

Although the hydrogen permeable membrane of each of the above-mentioned first to seventh embodiments is a self-supporting film as a thin metal film possessing hydrogen permeability, a hydrogen permeable membrane may also be formed by having a hydrogen permeable metal provided on a porous substrate possessing gas permeability. In other words, in order to form a metal layer in which a metal coating layer, an intermediate layer, a metal base layer, an intermediate layer, and a metal coating layer are layered in this order, a hydrogen permeable membrane obtained by sequentially forming the respective metal layers on a porous layer can be used. The hydrogen permeable membrane thus provided on the porous substrate can be used in the hydrogen extracting apparatus shown in FIG. 5 instead of the hydrogen permeable membrane 10 of the embodiments.

The invention claimed is:

1. A hydrogen permeable membrane for selectively allowing hydrogen to permeate therethrough, comprising:
   a metal base layer containing vanadium (V);
   a metal coating layer containing palladium (Pd); and
   an intermediate layer that is formed directly on the metal base layer between the metal base layer and the metal coating layer and is made of a metal having a higher melting point than the metal base layer and the metal coating layer and possessing hydrogen permeability.

2. The hydrogen permeable membrane according to claim 1, wherein the metal constituting the intermediate layer is composed of a single metal element.

3. The hydrogen permeable membrane according to claim 2, wherein the metal element is tantalum (Ta) or niobium (Nb).

4. The hydrogen permeable membrane according to claim 1, wherein the metal constituting the intermediate layer is an alloy.

5. The hydrogen permeable membrane according to claim 4, wherein the intermediate layer is made of an alloy is composed of a base metal having a higher melting point than the metal base layer and the metal coating layer and a additive metal.

6. The hydrogen permeable membrane according to claim 5, wherein the base metal is metal of group V.

7. The hydrogen permeable membrane according to claim 5, wherein the additive metal is vanadium (V) or palladium (Pd).

8. The hydrogen permeable membrane according to claim 5, wherein the intermediate layer comprises a first intermediate layer that is in contact with the metal base layer and a second intermediate layer that is in contact with the metal coating layer, wherein the first intermediate layer comprises vanadium (V) as the additive metal, and wherein the second intermediate layer comprises palladium (Pd) as the additive metal.

9. The hydrogen permeable membrane according to claim 5, wherein the additive metal contains at least one metal selected from cobalt (Co), nickel (Ni), copper (Cu), molybdenum (Mo), and titanium (Ti).

10. The hydrogen permeable membrane according to claim 5, wherein the additive metal contains at least one metal selected from silver (Ag), gadolinium (Gd), yttrium (Y), and platinum (Pt).

11. The hydrogen permeable membrane according to claim 5, wherein the intermediate layer comprises a first intermediate layer that is in contact with the metal base layer and a second intermediate layer that is in contact with the metal coating layer, wherein the first intermediate layer comprises, as the additive metal, at least one metal selected from cobalt (Co), nickel (Ni), copper (Cu), manganese (Mn), and titanium (Ti), and wherein the second intermediate layer comprises, as the additive metal, at least one metal selected from silver (Ag), gadolinium (Gd), yttrium (Y), and platinum (Pt).

12. A fuel cell comprising:
  an electrolyte membrane comprising an electrolyte layer possessing proton conductivity and a hydrogen permeable membrane formed on one face of the electrolyte layer;
  an oxidative gas supply portion that supplies an oxidative gas containing oxygen to one face of the electrolyte membrane; and
  a fuel gas supply portion that supplies a fuel gas containing hydrogen to the other face of the electrolyte membrane,
  wherein the hydrogen permeable membrane is the hydrogen permeable membrane according to claim 1.

13. A hydrogen extracting apparatus for extracting hydrogen from a hydrogen-containing gas containing hydrogen, comprising:
  the hydrogen permeable membrane according to claim 1;
  a hydrogen-containing gas flow passage which is formed on a first face of the hydrogen permeable membrane and through which the hydrogen-containing gas passes; and
  an extracted hydrogen flow passage which is formed on a second face of the hydrogen permeable membrane and through which hydrogen that has permeated through the hydrogen permeable membrane and been extracted from the hydrogen-containing gas passes.

14. A method of manufacturing a hydrogen permeable membrane for selectively allowing hydrogen to permeate therethrough, comprising:
  preparing a metal base layer containing vanadium (V);
  forming an intermediate layer made of an alloy directly on the metal base layer; and
  forming a metal coating layer containing palladium (Pd) on the intermediate layer,
  wherein the alloy has a higher melting point than the metal base layer and the metal coating layer and possesses hydrogen permeability.

15. The hydrogen permeable membrane of claim 1, wherein the metal base layer is non-porous.

16. A hydrogen permeable membrane for selectively allowing hydrogen to permeate therethrough, comprising
  a metal base layer containing vanadium (V) and having a first face and a second face;
  a first face intermediate layer that is formed directly on the first face,
  a second face intermediate layer that is formed directly on the second face; and
  a first face metal coating layer containing palladium (Pd) formed on the first face intermediate layer and a second face metal coating layer containing palladium (Pd) formed on the second face intermediate layer;
  wherein the first face intermediate layer is made of a metal having a higher melting point than the metal base layer and the first face metal coating layer and possessing hydrogen permeability and wherein the second face intermediate layer is made of a metal having a higher melting point than the metal base layer and the second face metal coating layer and possessing hydrogen permeability.

* * * * *